Nov. 5, 1935.					W. T. STEPHENS						2,019,938
AUTOMOTIVE LIFTING DEVICE
Filed Aug. 26, 1933					3 Sheets-Sheet 1
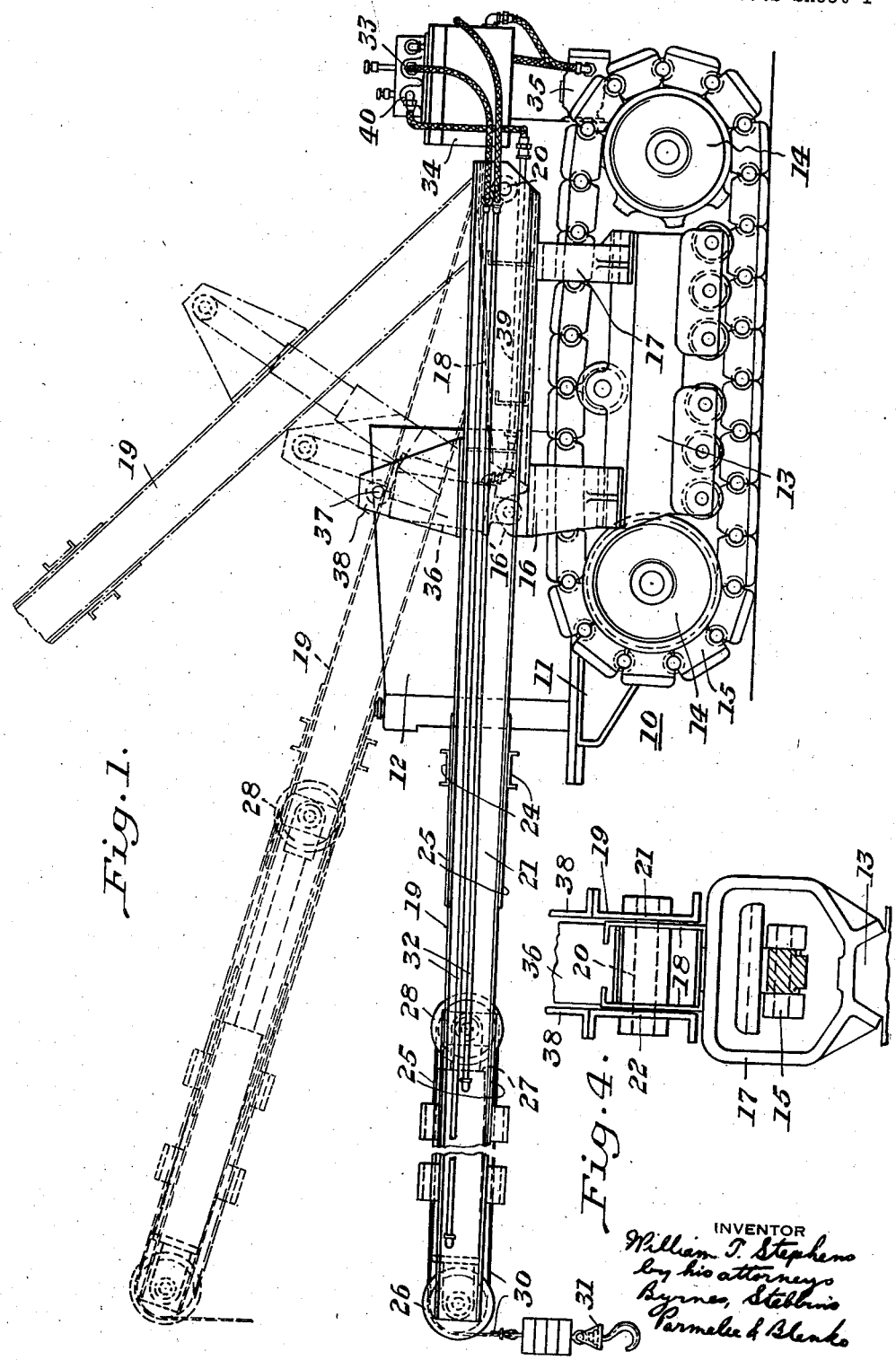

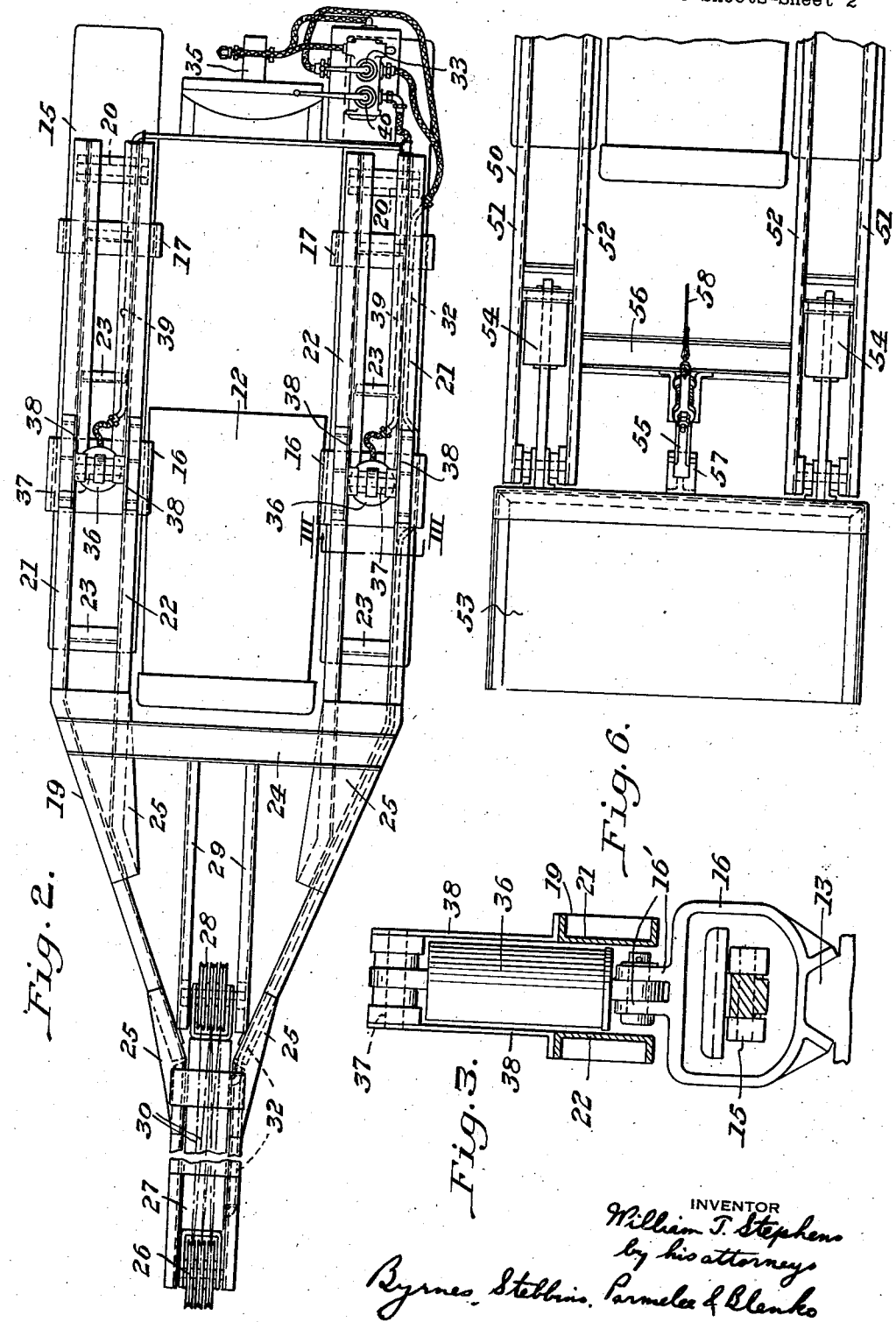

Nov. 5, 1935.  W. T. STEPHENS  2,019,938
AUTOMOTIVE LIFTING DEVICE
Filed Aug. 26, 1933  3 Sheets-Sheet 3
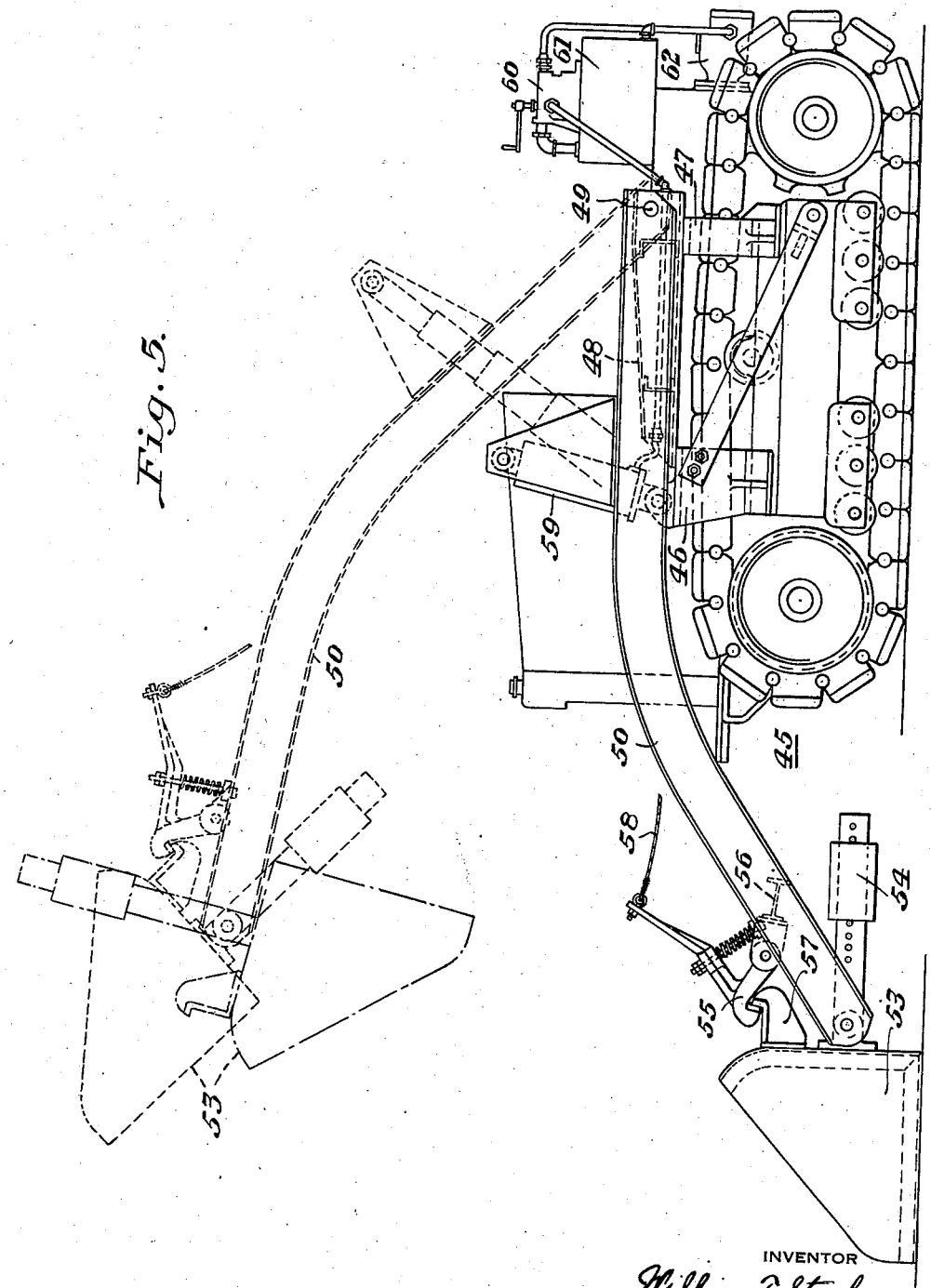
INVENTOR
William T. Stephens
by his attorneys
Byrnes, Stebbins, Parmelee & Blenko Patented Nov. 5, 1935

2,019,938

UNITED STATES PATENT OFFICE 2,019,938

AUTOMOTIVE LIFTING DEVICE

William T. Stephens, Youngstown, Ohio, assignor to The Commercial Shearing and Stamping Company, Youngstown, Ohio, a corporation of Ohio Application August 26, 1933, Serial No. 686,939

8 Claims. (Cl. 212—8)

My invention relates to a lifting device such as a crane or shovel and, in particular, to devices of this type which are of such size and capacity as to be adapted for mounting on automotive vehicles having linked flexible, continuous traction and supporting belts.

It has been proposed previously to mount lifting mechanism on tractors having continuous traction and supporting belts, but all such structures with which I am familiar are characterized by numerous objectionable features which have greatly restricted their use. In devices of this kind as heretofore constructed, a double drum winch for operating the crane hoist has been mouted on the rear of the tractor. This apparatus is expensive and is also objectionable because of the considerable weight thereof.

The hoist booms have heretofore been mounted on the tractor chassis which, in turn, is spring mounted on the track frames traversed by the traction belts. Because of the resilience of the springs between the chassis and the belt frames, the booms had little or no stability and the lifting capacity was correspondingly limited. Counterbalances were resorted to in an attempt to overcome these objections, but, of course, involved a further increase in the dead weight.

In accordance with my invention, I provide a mounting for a lifting device such as a crane or shovel embodying a tilting boom, which is supported directly on the track frames carrying the traction belts. Since these frames bear directly on the traction belts which rest on the ground or roadway, the mounting is not resilient, but is characterized by a high degree of rigidity and stability. At the same time, the ordinary spring suspension of the tractor chassis is not interfered with. Instead of a drum type winch, I employ a hydraulically operated reciprocating wind-up mounted adjacent the outer end of the boom. The boom is elevated by hydraulic jacks pivoted thereto and having bearing on the traction belt frames. A pump and suitable control valves are provided for supplying fluid under pressure for operating the boom lifting and wind-up jacks. The pump is mounted so as to be conveniently driven from the tractor engine.

For a more complete understanding of the invention, reference is made to the accompanying drawings illustrating the present preferred embodiments. In the drawings—

Figure 1 is a side elevation of a tractor-mounted crane constructed in accordance with my invention;

Figure 2 is a plan view thereof;

Figure 3 is a partial sectional view along the plane of line III—III of Figure 2;

Figure 4 is a partial end elevation of the inner end of one side of the boom of the crane;

Figure 5 is a view similar to Figure 1, showing the invention embodied in a shovel or loader; and Figure 6 is a partial plan view of the loader of Figure 5.

Referring now in detail to the drawings, and for the moment, to Figures 1 through 4 in particular, a tractor 10 comprises a chassis 11 having an engine mounted thereon within a hood 12. The chassis is spring supported on traction belt or track frames 13 provided with traction and guiding sprockets 14 around which are trained continuous linked traction belts 15.

Front and rear bearings 16 and 17 are secured to the belt frames on opposite sides of the tractor. The front and rear bearings on the same side are connected by channels 18.

A boom 19 fabricated of structural shapes is pivoted on pins 20 extending through the channels 18. The boom 19 comprises outer channels 21 and inner channels 22, bent as illustrated and connected by spacer plates 23 and bracing channels 24. Reinforcing gussets 25 are welded to the channels adjacent their bent portions.

A multiple sheave block 26 is carried at the outer end of the boom 19. A hydraulic jack 27 is mounted adjacent the block and its piston is provided with a corresponding block 28. Guide channels 29 extend between the outer channels 21 and the bracing chanels 24 to provide trackways for the reciprocating block 28. A cable 30 having a weighted hook 31 at its free end is trained successively over the sheaves of the blocks 26 and 28 and has one end fixed in any convenient manner to the boom. The cable is trained over the sheaves in the known manner so that when the jack 27 is extended, the cable 30 will be wound up at a rate depending on the rate of movement of the block 28 and the multiplying factor of the sheave system which, of course, is determined by the number of sheaves employed.

The jack 27 is double acting, opposite ends thereof being connected by conduits 32 to a valve 33 which, together with a reservoir 34 and a pump 35 arranged to be driven by the tractor engine, constitute the complete hydraulic system necessary for the operation of the wind-up jack 27. When the jack 27 is retracted, the weight of the hook 31 causes the latter to drop and take up the slack in the cable 30.

The forward bearings 16 have upstanding ears

16' providing pivotal supports for boom lifting jacks 36. The pistons of the jacks 36 are pivoted to pins 37 which extend through hanger plates 38 on opposite sides of the jacks, and secured to the channels 21 and 22. The jacks 36 are single acting and each has a conduit 39 extending to a valve 40 connected in the hydraulic system previously described.

It will be apparent that operation of the pump 35 and manipulation of the valve 40 will cause the jacks 36 to be extended so that the boom 19 is lifted successively to elevated positions such as those illustrated in dotted and chain lines respectively in Figure 1, the extent of elevation of the boom being directly under the control of the operator of the valve 40. The hoist jack 27, likewise, controlled by the valve 33, may be operated to any desired extent, to exert the required lift on a load suspended on the hook 31. The construction illustrated is designed to wind up approximately eighteen feet of the cable 30 which is sufficient for all ordinary service.

The aforementioned advantage as to rigidity and stability of the boom mounting will now be apparent from the specific description given. The boom is pivoted well toward the rear of the tractor on the channels 18 which are secured to the bearings 16 and 17. The latter are carried directly on the belt frames and, in effect, rest directly on the ground or roadway. The location of the boom hinge 20 permits the crane to lift a heavy load without danger of tipping even though no counter-balancing is employed. With the boom in the chain line position of Figure 1, for example, a device of the character of that illustrated had a capacity of 5000 lbs. An earlier type of tractor crane had a capacity of only 700 lbs, in a similar position, without counter-balancing. Since the boom is generally of yoke shape, it can be lowered to the full horizontal position without interfering with the tractor chassis. A wide operating range is thus provided. The hydraulic jack for the cable hoist is cheaper and lighter than the drum wind-up, and provides a more flexible control of the load being hoisted.

In a modified form of the invention illustrated in Figures 5 and 6, the principles described above are utilized in the construction of a loader or shovel. The construction of Figures 5 and 6 is quite similar to that of Figures 1 through 4, including a tractor 45 on the traction belt frames of which are mounted front and rear bearings 46 and 47, connected by longitudinally extending channels 48. Pins 49 extending through the channels 48 at the rear end thereof provide a pivotal mounting for a boom 50 composed of outer channels 51 and inner channels 52. As shown in Figure 5, the outer ends of the boom members are bent downwardly to provide bearings for pivotally supporting a shovel 53 thereon. The shovel has counter-weights 54 effective when the shovel is emptied to retract it to the digging position shown in solid lines in Figure 5.

A retractible detent 55 mounted on a cross beam 56 constituting a brace adjacent the outer ends of the boom members, cooperates with a hook 57 on the shovel. When the shovel is loaded and lifted, the weight of the contents is sufficient to overbalance the counter-weights 54 when the detent 55 is retracted as by pulling on a dumping cable 58.

The boom 50 is provided with lifting jacks 59 which are practically identical with corresponding elements of the crane structure already described in detail. These jacks are controlled by a valve 60, the hydraulic system including also a reservoir 61, a pump 62 and suitable connecting conduits.

The operation of the shovel of Figures 5 and 6 will be obvious from the description of the structure thereof. When the shovel is lifted and dumped, the counter-weights 54 restore it to digging position with the detent 55 engaging the hook 57.

The automotive shovel just described is characterized by the same advantages and desirable features as the tractor crane, including the stability of the mounting, the flexibility of control, and its large capacity compared to equipment of corresponding size as heretofore constructed.

Although I have illustrated and described herein but two preferred embodiments of my invention, it will be apparent that numerous changes in the details of the apparatus described may be made without departing from the spirit of the invention or the scope of the appended claims.

I claim:

1. Lifting apparatus for mounting on an automotive vehicle having traction belts traversing track frames, comprising bearings attached to said frames in spaced relation, longitudinal members supported on said bearings, a boom hinged adjacent the rear end of said longitudinal members, and a hydraulic jack pivoted to one of said bearings and having pivotal connection with said boom.

2. The combination with an automotive vehicle having traction belts traversing track frames, of supports resting on said frames, means on said supports providing a hinge bearing, a boom extending forwardly of the vehicle mounted in said hinge bearing, and a hydraulic jack pivoted to one of said supports and connected to the boom to cause tilting movement of the latter on extension of the jack.

3. A boom mounting for use on automotive vehicles having traction belts traversing track frames, comprising bearings extending upwardly from said guiding frames, a boom hingedly mounted on said bearings, and a hydraulic jack pivoted to one of said bearings and connected to the boom to cause tilting movement of the latter on extension of the jack.

4. The combination with an automotive vehicle having a crawler track frame on each side and a pair of supporting bearings resting on each of said frames, of a tilting boom having one end bifurcated, each of the bifurcations being pivoted on a bearing on one side of the vehicle, and a hydraulic jack pivoted to the other bearing on each side of the vehicle and pivotally connected to said boom.

5. A lifting boom for mounting on automotive vehicles having traction belts traversing track frames, comprising forwardly extending members overlying the belts, hinge bearings on opposite sides of the vehicle for the inner ends of said members, and means for supporting said hinge bearings directly above said belts on said track frames.

6. A lifting device for mounting on an automotive vehicle having traction belts, comprising a forwardly extending boom structure having parallel portions overlying said belts, a plurality of hinge bearings disposed directly above said belts, said boom being pivoted in certain of said bearings, and a hydraulic jack connected to each of said portions for exerting a lifting effort on the boom, said jacks being pivoted in others of said bearings.

7. In a hoisting crane adapted for mounting on an automotive vehicle having traction belts traversing track frames, a boom having spaced parallel portions, means for hingedly supporting such portions from said frames above said belts, said portions converging forwardly of the belts to provide a bearing for a cable sheave, a sheave journaled in said bearing, guides extending from a point adjacent the outer end of the boom toward said means, a sheave block movable along said guides, a cable trained over said sheaves, and a hydraulic jack for actuating said movable sheave block.

8. An automotive lifting device adapted for mounting on a traction vehicle having crawler belts traversing track frames, said device including a bearing, means mounted on one of said frames adjacent the rear thereof for supporting the bearing, a boom pivotally supported in said bearing, a second bearing on said one of said frames ahead of the first mentioned bearing, and extensible means pivotally connected to said second bearing and to said boom, said means being effective on extension to tilt the boom.

WILLIAM T. STEPHENS.